US005781143A

United States Patent [19]

Rossin

[11] Patent Number: 5,781,143

[45] Date of Patent: Jul. 14, 1998

[54] AUTO-ACQUIRE OF TRANSMITTER ID BY RECEIVER

[76] Inventor: John A. Rossin, 520 N. 8th St., Lompoc, Calif. 93436

[21] Appl. No.: 794,201

[22] Filed: Jan. 24, 1997

Related U.S. Application Data

[60] Provisional application No. 60/011,223, Feb. 6, 1996.

[51] Int. Cl.$^{6}$ .......................... G08C 19/12; H04L 17/02

[52] U.S. Cl. .......................... 341/173; 341/176; 340/506; 340/539; 340/825.22; 340/825.52; 340/825.69; 340/825.72; 455/410

[58] Field of Search .......................... 341/176, 173, 341/174, 178, 182; 340/534, 539, 870.11, 870.19, 825.22, 825.52, 825.69, 825.72, 506, 825.31; 455/410, 411

[56] References Cited

U.S. PATENT DOCUMENTS

| | | | |
|---|---|---|---|
| Re. 35,364 | 10/1996 | Heitschel et al. | 364/400 |
| 4,228,424 | 10/1980 | Le Nay et al. | 340/506 |
| 4,529,980 | 7/1985 | Liotine et al. | 340/825.52 |
| 4,772,876 | 9/1988 | Laud | 340/539 |
| 4,855,713 | 8/1989 | Brunius | 340/506 |
| 4,881,148 | 11/1989 | Lambropoulos et al. | 361/172 |
| 5,077,547 | 12/1991 | Burgmann | 340/501 |
| 5,148,159 | 9/1992 | Clark et al. | 340/825.22 |
| 5,291,193 | 3/1994 | Isobe et al. | 340/825.69 |
| 5,408,217 | 4/1995 | Sanderford | 340/506 |
| 5,473,318 | 12/1995 | Martel | 340/928 |
| 5,635,913 | 6/1997 | Willmott et al. | 340/825.22 |

*Primary Examiner*—Jeffery Hofsass
*Assistant Examiner*—Timothy Edwards, Jr.

[57] ABSTRACT method and apparatus to automatically store unique identity code of a plurality of wireless transmitters into permanent memory of a receiver control. By specifying and establishing in the receiver control the quantity of transmitters to be installed and causing each transmitter to transmit identity code along with a longer than normal preamble, new identity codes will be stored in receiver control memory. Each time a new identity code is stored one is subtracted from established quantity and when zero is reached storing is disabled.

2 Claims, 4 Drawing Sheets

AUTO-ACQUIRE OF TRANSMITTER ID BY RECEIVER

This Application claims the benefit of U.S. Provisional Application No. 60/811,223 filed Feb. 6, 1996, now abandoned.

FIELD OF THE INVENTION

This invention relates to a way to have identity codes of factory programmed supervised security system transmitters programmed automatically into permanent memory of a receiver control located at installation site.

BACKGROUND OF THE INVENTION

Wireless transmitters and receivers of the type to be described here, are used for short range RF link in security installations of homes, businesses with large open lots or small store businesses. With the need for fully supervised wireless security systems it became necessary to identify each transmitter at the receiver control when a signal was received, to be able to tell if a transmitter is no longer transmitting of is physically missing.

Some methods that program transmitters at installation location have programmed all the transmitters to match a particular receiver identification code. This was accomplished for example by hand held programmers, others required plugging the transmitter into the receiver while others required the transmitter to be held very close to the receiver so the identity code can be transferred to a transmitter. However most of these are best used for garage door openers or for remote control applications, because most systems did not provide full supervision, such as which transmitter is no longer transmitting or is physically missing.

Others transfer identity code a greater distance to the receiver when the transmitter is activated by pressing a tamper switch after the control has placed in program mode by a manual switch. Another method transfers identity code when a certain code is transmitted to receiver control which has been manually placed in program mode and a timer has been manually activated to allow programming to continue for a limited time only.

OBJECTS AND ADVANTAGES OF THE INVENTION

Accordingly one object and advantage is to give the installer unlimited time to program in the transmitter identity codes to the receiver control. According to one prior art method described in U.S. Pat. No. 5,291,193 which includes a timer period that must be reset frequently, could cause the installer difficulty if after having just mounted the transmitter and now ready to make the transmitter send its identity code to the receiver control, the control timed out of program mode. This would require the installer to go back to the receiver control location, some times 500 feet or more to press a button to restart the timer, then go back to the transmitter location to activate the transmitter so the identity code could be recorded by the receiver control. This problem is completely eliminated by the present invention by specifying the quantity of transmitters to be installed.

Another object and advantage is to make it possible for the installer of the security system to mount the transmitters and test each one for desired function, without having to go back to the receiver control and manually switch from program mode to alarm or test mode. This is very useful with transmitters which have more than one trigger input, or if dipswitch selection of optional functions of a transmitter are used. A mistake can be corrected and then retest for desired function without wasting time going back to the receiver control. This is possible because the present invention does not use a program mode selection switch, instead the quantity of transmitters to be installed is selected at the receiver control. According to one prior art method described in U.S. Pat. No. 4,855,713 the only option given is to go back to the controller and scroll back to the previously programmed codes for verification of identification code only, or switch out of program mode for complete system operation testing. Additionally with the prior method the installer can accidentally trigger a transmitter by bumping a tamper switch while mounting or handling a transmitter which has a battery that cannot be removed and cause it to send a identity code out of desired sequence, important if sequential numbering for wireless PIRs or window transmitters is desired for easy zoning purposes. For example the receiver control might assign number 1 instead of 8 to that transmitter. The present invention overcomes this problem by commencing transmission of identity code for programming only after transmitter mounting is completed and then automatically when the battery is snapped into battery holder. Another difference is the transmitters for the present invention are each factory programmed with a different identification number, rather than pseudo random numbers as is the prior art. With pseudo random there is a possibility of having a duplicate at a job site, which would have to be removed and replaced with a new transmitter.

Finally the present invention offers ease of use. Simply select the number of transmitters to be installed at the receiver control, mount the transmitter, and snap in the battery. Identification codes and zone assignments are programmed in automatically.

Other objects, features and advantages of this invention will become apparent from the following description and drawings.

SUMMARY OF THE INVENTION

The present invention comprises a receiver-control that will automatically acquire identity code of transmitters and transmitters that self initiate the programming of their identity code into the receivers' permanent memory.

A transmitters that have been factory programmed each with different identity codes and have software instructions such that cause a longer than normal preamble to be transmitted when a battery is snapped into a battery holder. Each transmits a longer than normal preamble along with the identity code number stored in the transmitters permanent memory to the receiver control. The receiver control then checks for duplicates, if none found, stores the new identity code number and assigns a transmitter number to the identity code number just stored in the receivers permanent memory. Storage of new identity code will only take place if some quantity number of transmitters to be programmed is entered manually into receiver control. When a new identity code number is stored one is subtracted from the original quantity entered manually, when zero is reached no more identity codes will be stored by receiver-control.

CONCLUSIONS, RAMIFICATIONS, AND SCOPE

Accordingly, it can be seen that the present invention provides a programming method that is automatic after once specifying the quantity of transmitters to be installed at the receiver and by having the transmitters automatically transmit a programming sequence when battery is snapped in.

Although the description above contains many specificitys, these should not be construed as limiting the scope of the invention but as merely providing illustrations of some of the presently preferred embodiments of this invention. Various other embodiments and ramifications are possible within its scope. For example, like transmitting a different programming sequence or some other initiating action other than snapping the battery into its holder, for example pushing a switch. Thus the scope of the invention should be determined by the appended claims and their legal equivalents, rather than by the examples given.

DETAILED DESCRIPTION

Figure 1:
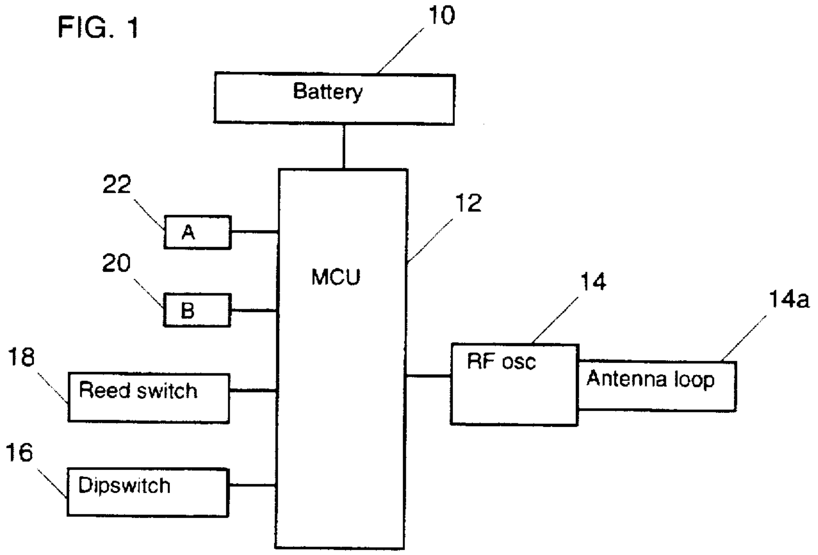
FIG. 1 shows the transmitter MCU, trigger inputs, function selection dipswitch, RF oscillator, and a lithium battery.

The transmitter uses a 3 volt lithium battery 10 (FIG. 1) for power. A one time programmable microcontroller 12, such as a Motorola MC68HC705k1P, is used to process input triggers. A single transistor RF oscillator 14 is connected to a loop of wire 14*a* about two inches long. Indicated by A, input pin 22 is one of two input trigger channels. B, input pin 20 is the other input trigger channel. Screw terminals A 22, and B 20 are located on the transmitter circuit board. A magnetic reed switch 18 is located internally on the transmitter circuit board. The magnetic reed switch is connected internally to screw terminal B 20. When reed switch 18 is used, no external connection is made to screw terminal B. A dipswitch 16 is used to select functional options.

In the receiver alarm control, MCU 34 (FIG. 3), such as a MC68HC705C8ACP, controls all functions. A dipswitch 36 sets optional functions. Antenna 38*a* is a wire whip about 10 inches long. RF receiver 38, receives signal from the transmitter and then is transferred to a decoding circuit 42. For non-volatile memory an eeprom 46 is used. Audio indicator output 48, is an open collector npn transistor of high current capability. Tactile switch 50 is for auxiliary or optional functions. Tactile switch 52 is used for downward scrolling of displayed numbers. Tactile switch 54 is used for upward scrolling of displayed numbers. Tactile switch 56 is used to 'set' or retain selections made with the other tactile switches. Tactile switch 58 is used to select transmitter mode. Tactile switch 60 is used to select zone mode. Zone outputs 62 provide connection capability to a burglar alarm control panel. A display 64, either LED or LCD, indicates transmitter numbers or zone numbers. Power supply 66 is from an alarm control panel to which the receiver alarm control is connected to for power.

Figure 2A:
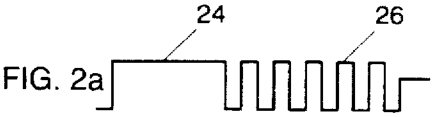
FIG. 2*a* shows an example of a longer than normal preamble along with a sample of ID bits.
Figure 2B:
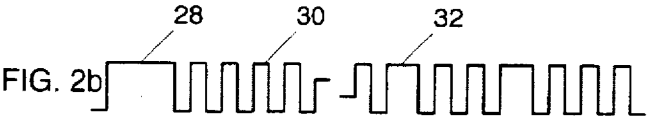
FIG. 2*b* shows an example of a normal preamble along with a sample of ID bits, in addition, an example of alarm status bits.

FIG. 2*a* 24 illustrates a longer than normal preamble, when compared to FIG. 2*b* 28 which is a normal preamble. The actual length is not important, just so there is enough difference to be easily detected. An example of a portion of ID number bits is illustrated by 26 (FIG. 2*a*) and 30 (FIG. 2*b*). The actual number of ID bits used is typically 16 to 24 bits. In FIG. 2*b* is an example of alarm status bits 32. The wider bits indicate alarm or some other condition like a weak battery.

Operation

Figure 4A:
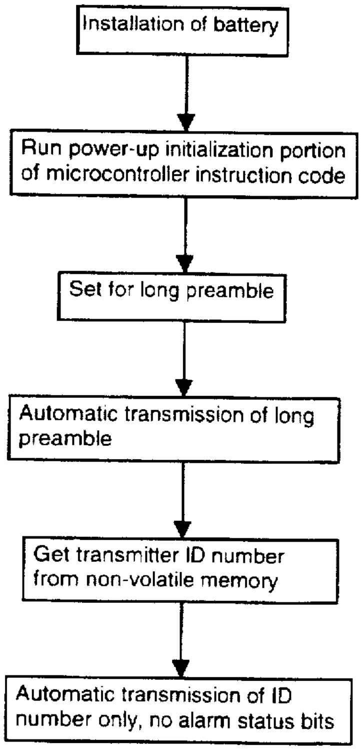
FIG. 4*a* shows MCU instruction code steps for transmitter when battery is first installed.

The following paragraph describes in detail the instruction code functions of FIG. 4*a*.

Figure 3:
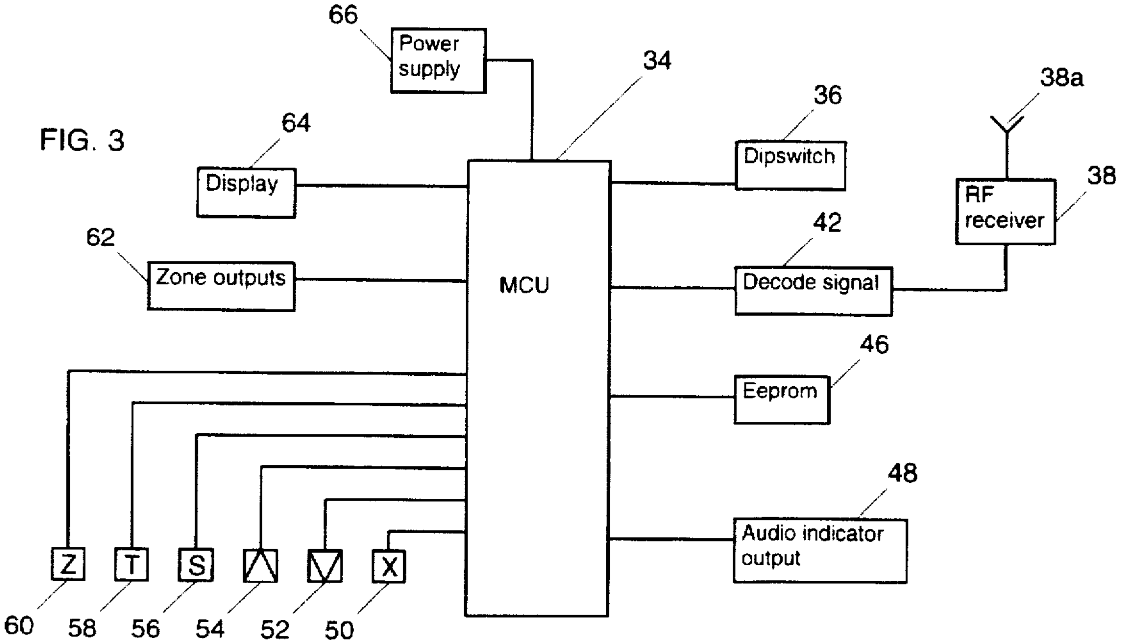
FIG. 3 shows the receiver alarm control MCU, including function selection dipswitch, RF receiver, decoding signal circuit, eeprom for non-volatile memory, audio indicator output for external audio indicator, tactile switches are marked with z-t-s-uparrow-downarrow, zone outputs for connection to control panel, display for transmitter or zone numbers, and finally power supply source.

In FIG. 1, when battery 10 is first installed in a transmitter (FIG. 1), power-up initialization portion of microcontroller instruction code is run (FIG. 4*a*). Part of this instruction causes a long preamble 24 (FIG. 2*a*), along with transmitter ID number 26 to be automatically transmitted to receiver alarm control. Alarm status bits 32 (FIG. 2*b*) are not transmitted with this transmission. This longer than normal preamble 24 (FIG. 2*a*) instructs receiver alarm control to store received transmitter identification number in eeprom 46 (FIG. 3).

Figure 4B:
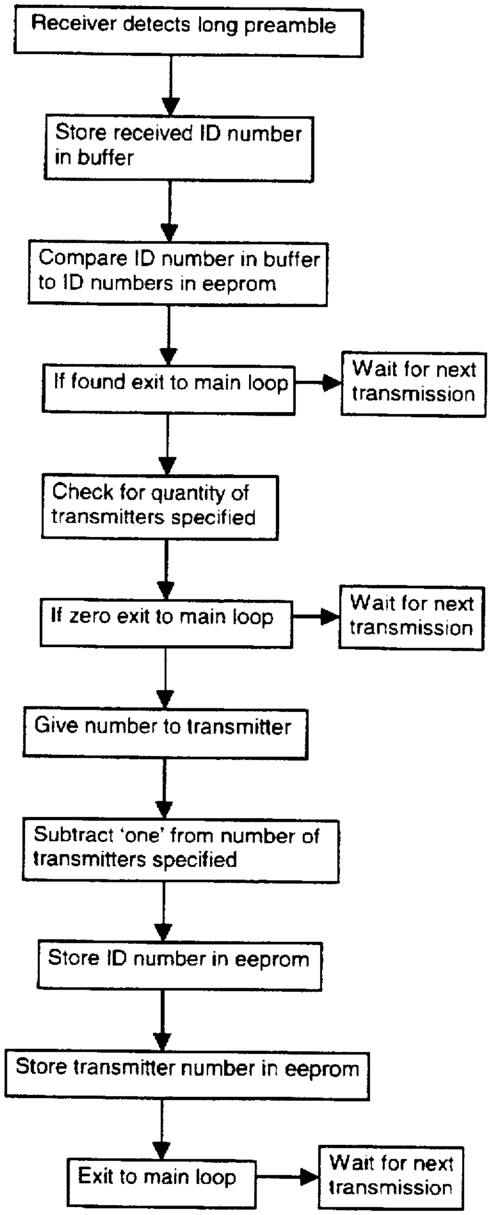
FIG. 4*b* shows MCU instruction code steps for alarm receiver control when long preamble is detected.

The following paragraph describes in detail the instruction functions of FIG. 4*b*. When receiver alarm control detects a long preamble 24 (FIG. 2*a*), it stores received ID number in a buffer. Next it compares this number in buffer to ID numbers in eeprom 46 (FIG. 3). If a matching ID number is found in the eeprom, instruction program for MCU 34 returns to main instruction loop and waits for next transmission. If matching ID number is not found in eeprom the program checks for quantity of transmitters specified. The quantity of transmitters to be installed is specified by tactile switches or scroll buttons 52, 54 (FIG. 3) at the receiver alarm control. If quantity specified equals zero, program returns to main loop and waits for next transmission. If not zero, next program step assigns a transmitter number to the ID number just properly received. Then the program subtracts 'one' from the specified quantity of transmitters for receiver alarm control to acquire. When zero is reached, the receiver alarm control (FIG. 3) will not accept additional transmitters after this installation is completed. Next the program stores ID number of transmitter in eeprom. Then the program stores the assigned transmitter number, next to transmitter ID number of that transmitter, in eeprom 46 (FIG. 3). Program then jumps to main loop and waits for next transmission. This prevents the acquiring of ID numbers by receiver alarm control from other nearby new burglar alarm installations to follow, or when batteries 10 (FIG. 1) are changed in old nearby burglar alarm installations. To reset receiver alarm control to accept more transmitters, momentarily disconnect power 66 (FIG. 3) to receiver alarm control or use a designated switch 36 (FIG. 3).

Figure 5A:
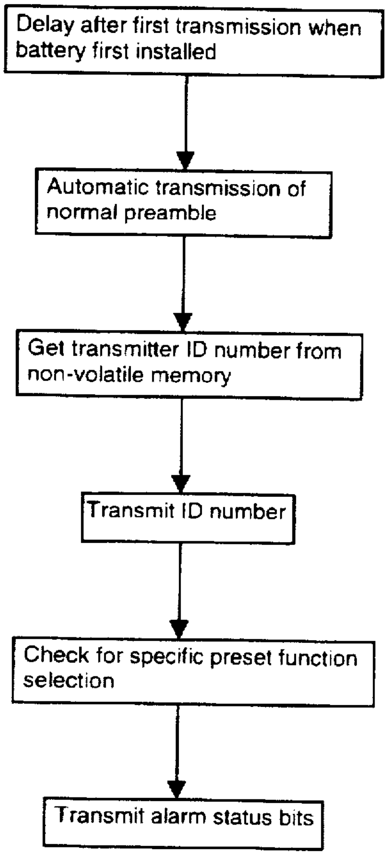
FIG. 5*a* shows test sequence instruction code for transmitter.

The following paragraph describes in detail the instruction code functions of FIG. 5*a*. There is a delay after the first transmission by the transmitter which occurred when battery was first installed. Then an automatic transmission of a normal preamble occurs, followed by ID number and alarm status bits.

Figure 5B:
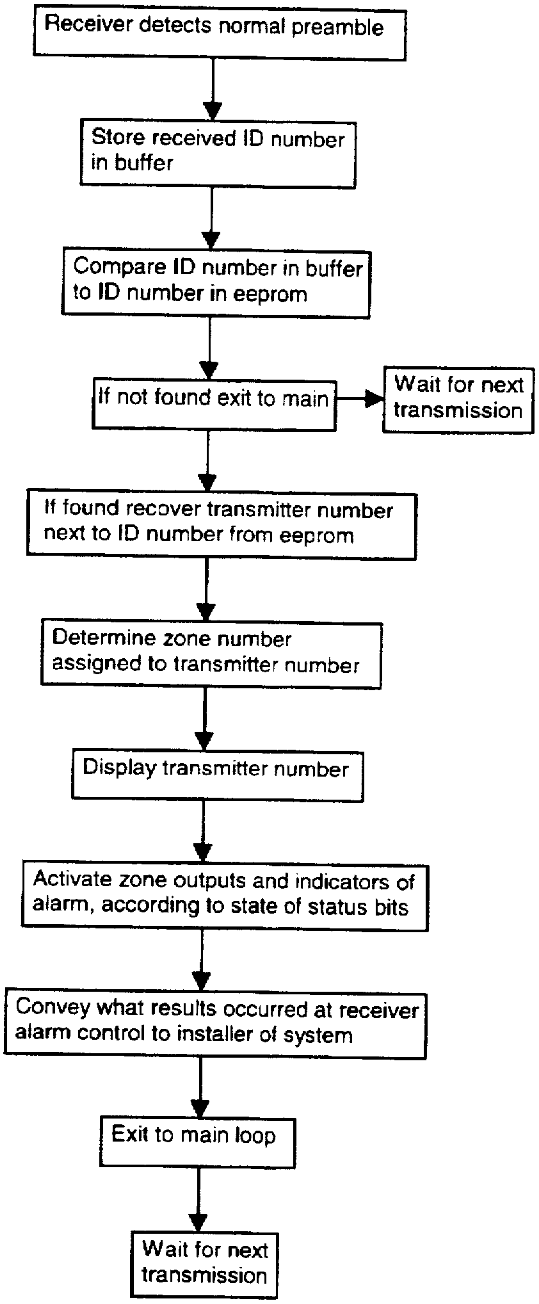
FIG. 5*b* shows receiver instruction code after receiving test transmission from Transmitter.

The following paragraph describes in detail the instruction code functions of FIG. 5*b*. During this second transmission a normal preamble, along with ID number and alarm status bits is received by the receiver alarm control. The program next compares this ID number to ID numbers in eeprom. A match indicates success of storing initial ID transmission in eeprom. Success is indicated by audio indicator output 48 (FIG. 3) and by zone outputs 62 also by display 64. This completes the sequence of acquiring transmitter ID numbers by the receiver alarm control.

Figure 6A:
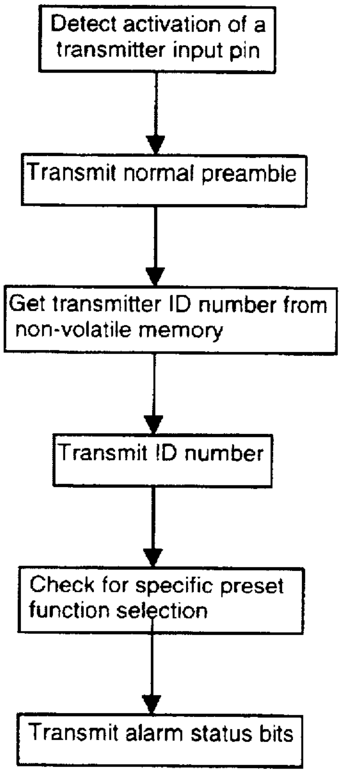
FIG. 6*a* shows MCU instruction code when transmitter is activated during normal use.

The following paragraph describes in detail the instruction code functions of FIG. 6*a*. Normal alarm sequence description follows. First when one of transmitter FIG. 1 trigger inputs 22,20,18 sees a change of state, MCU 12 (FIG. 1) first checks what optional function selections have been made by dipswitch 16. Then it sends digital pulses FIG. 2*b* to RF oscillator 14 (FIG. 1) and antenna loop 14*a*.

Figure 6B:
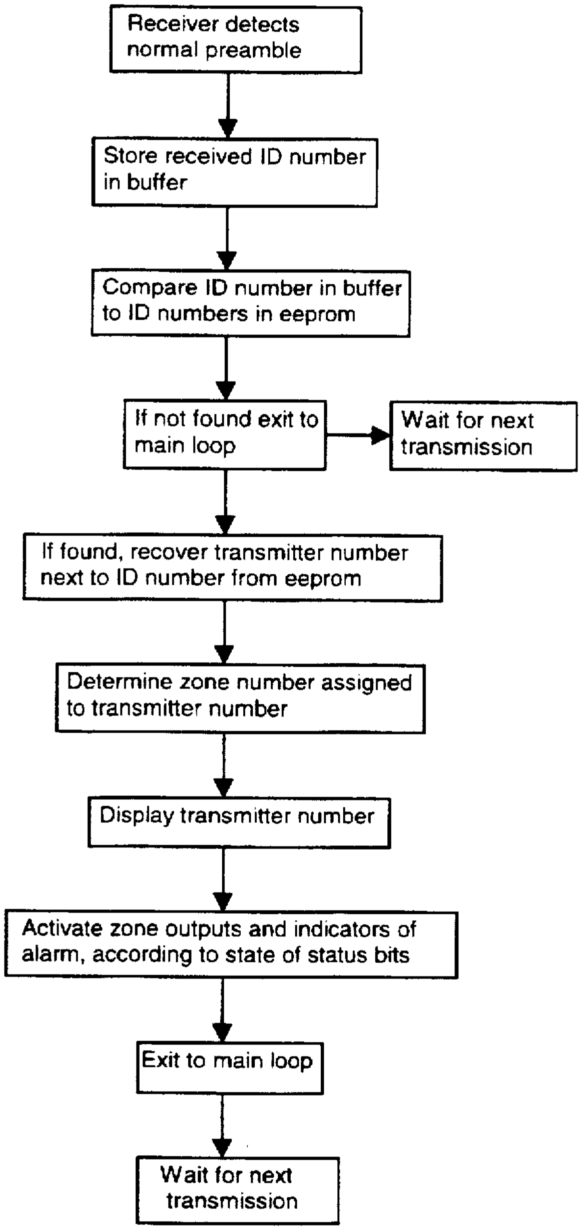
FIG. 6*b* shows MCU instruction when receiver control receives an alarm transmission during normal use.

The following paragraph describes in detail the instruction code functions of FIG. 6*b*. After receiving RF signal, receiver alarm control next determines whether it is a long or normal preamble. If receiver alarm control detects a normal preamble, it stores the ID number and alarm status bits in a buffer. Next it compares the just received ID number to ID numbers in eeprom 46 (FIG. 3). if not found, MCU 34 (FIG. 3) instruction program will jump to main loop and wait for next transmission. If found, program will recover assigned transmitter number located in eeprom 46 next to ID number. Next the receiver alarm control will display assigned transmitter number on alarm control display 64. After which, the MCU will activate zone outputs 62 and indicators of status according to condition of alarm status bits 32 (FIG. 2*b*). Finally program instructions exit to main loop and wait for next transmission.

What is claimed is:

1. A method for programming a receiver control permanent memory with a plurality of unique identity codes of wireless transmitters, comprising:

(a) establishing in said receiver control the quantity of said transmitters said receiver control will accept;

(b) causing said transmitters to transmit unique identity code along with a wider preamble than normally transmitted;

(c) temporarily storing each received identity code in said receiver control;

(d) comparing temporarily stored identity code to identity code stored in said receiver control permanent memory and if no match found store temporarily stored identity code to said receiver control permanent memory;

(e) subtracting one from total quantity of said transmitters specified as each said transmitter identity code is programmed into said receiver control until zero is reached;

(f) disabling storing of identity code by said receiver control when zero count is reached.

2. In a security alarm system including a plurality of wireless transmitters and a receiver control that automatically stores unique transmitter identity code into said receiver control permanent memory, comprising;

(a) means for establishing in said receiver control the quantity of said transmitters said receiver control will accept;

(b) means for causing said transmitters to transmit identity code along with a wider preamble than normally transmitted;

(c) means for receiving identity code from said transmitters and detecting a longer preamble than would normally be transmitted by said transmitters;

(d) means for temporarily storing each received identity code in said receiver control;

(e) means for comparing temporarily stored identity code to identity code stored in said receiver control permanent memory and if no match found store temporarily stored identity code into said receiver control permanent memory;

(f) means to subtract one from established quantity of said transmitters said receiver will accept and to determine if established quantity of said transmitters has reached zero;

(g) means to automatically disable storing of said transmitter identity code by said receiver control when established quantity has reached zero.

* * * * *